United States Patent Office 3,121,151
Patented Feb. 11, 1964

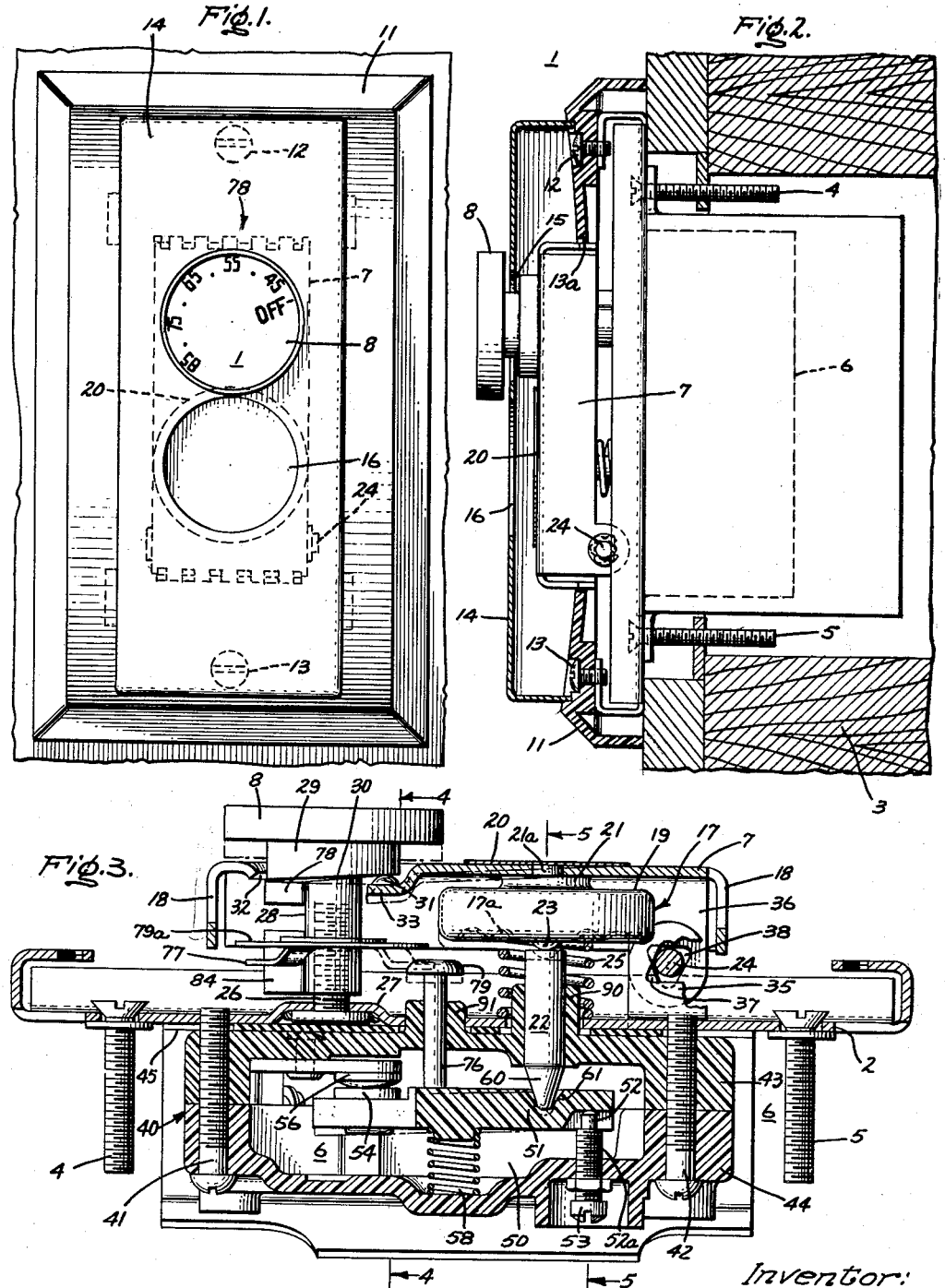

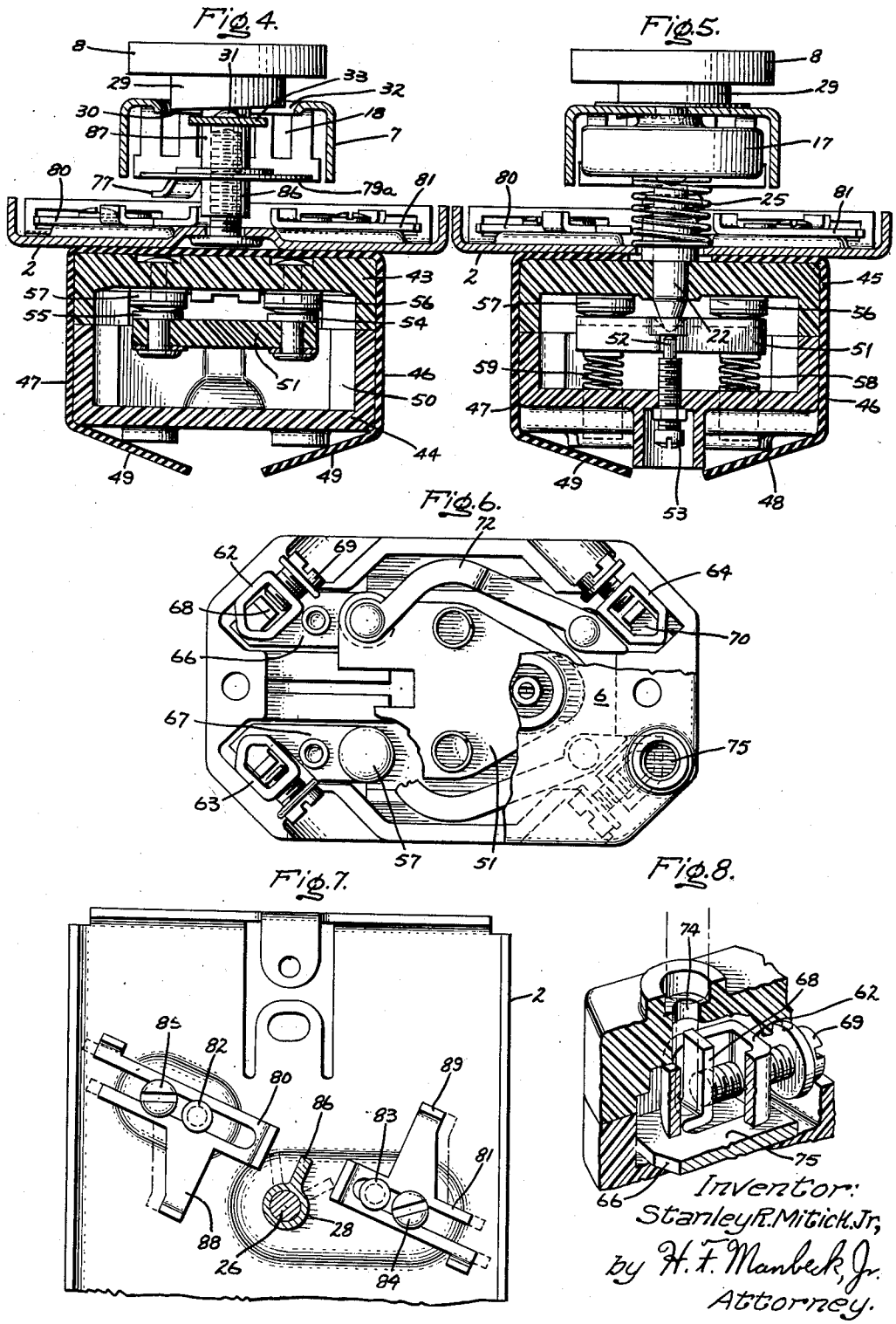

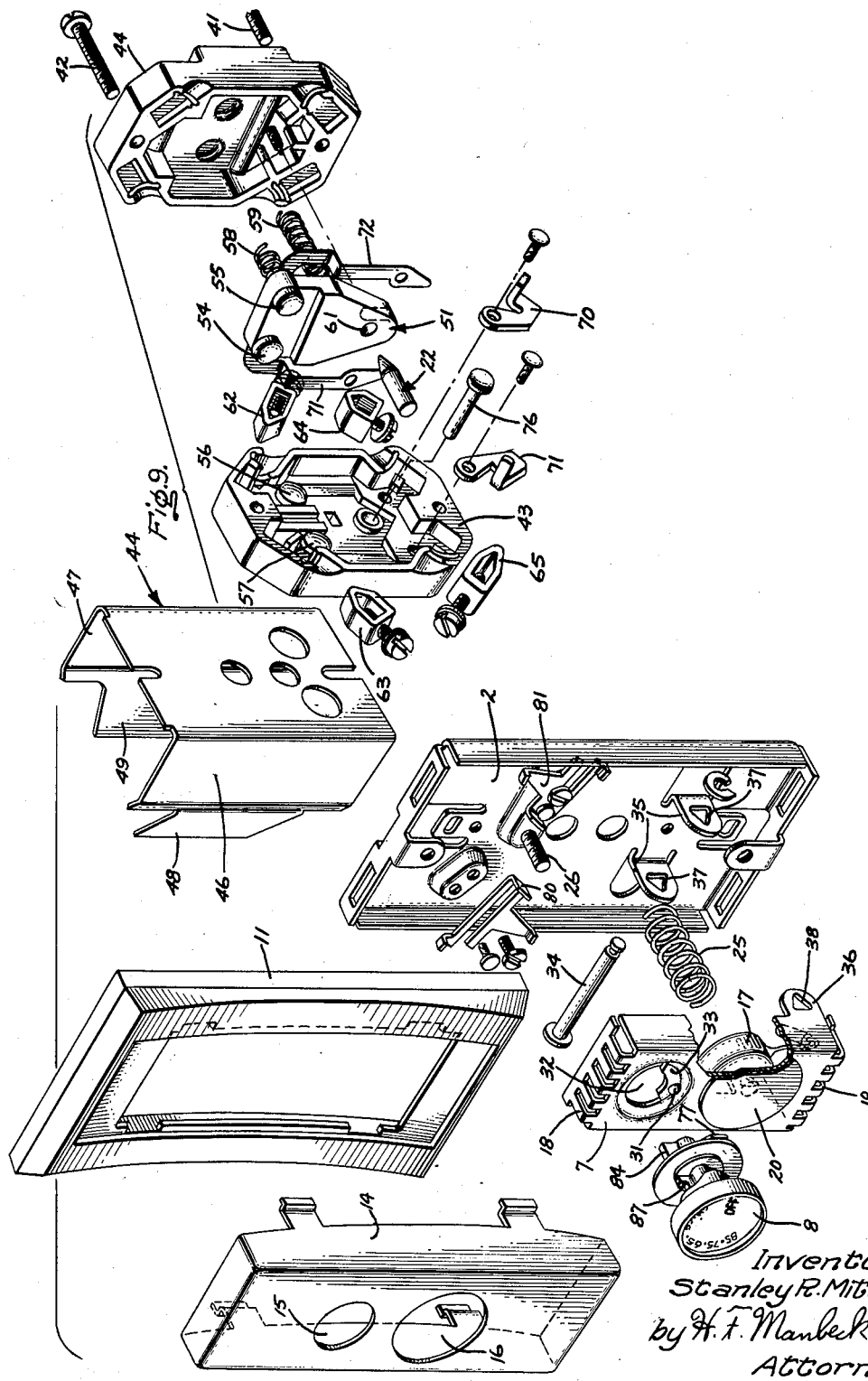

3,121,151
AMBIENT RESPONSIVE THERMOSTAT WITH A HEAT CONDUCTIVE LEVER
Stanley R. Mitick, Jr., Morrison, Ill., assignor to General Electric Company, a corporation of New York
Filed Nov. 28, 1961, Ser. No. 155,282
8 Claims. (Cl. 200—140)

My invention relates to thermostats for controlling the temperature of a room or other enclosure, and more particularly to thermostats which are suitable for use with radiant heating systems.

When a radiant heating system involving radiant walls or panels is used for room heating, a person seated in the room is subjected both to the temperature of the ambient air mass and to the direct radiant heat from the panels or walls. Thus, to provide proper control for the system, the thermostat should be sensitive to the radiant heat as well as to the ambient air temperature. If air temperature alone is relied on for control, the heating cycle may be so long that the individual will become uncomfortable due to the radiant heat received by his body even though the air temperature is somewhat below the desired level. For the thermostat to be sensitive to radiant heat, the diaphragm or other temperature sensing control element must be arranged in a more or less exposed position so that it will receive the direct heat radiation at least to some degree. This means that a different construction is required for the radiant heat thermostat as contrasted to thermostats for other types of heating systems, wherein the diaphragm or other control element may be placed in a protected position for sensing only the room air temperature. However, besides exposing the control elements, the construction must also be such that the diaphragm is not subjected to damage due to its exposed position either during installation or normal use.

Accordingly, an object of my invention is to provide an improved room thermostat which is sensitive both to radiant heat and to the room temperature but which mounts the control element in a manner that it is not subject to damage.

Another object of my invention is to provide an improved room thermostat for radiant heating systems, which is effective to provide accurate control of the room temperature over a wide range of adjustment.

A further object of my invention is to provide a room thermostat for radiant heating systems, in which the control element is so mounted that the calibration and operation of the thermostat will not be affected even if it is bumped or jarred during installation or use.

Still a further object of my invention is to provide an improved thermostat for radiant heating systems, which may be readily produced at reasonable cost by mass production manufacturing techniques.

In carrying out my invention in one form thereof, I provide a room thermostat which includes a temperature responsive diaphragm assembly as its actuator. The diaphragm is mounted on the underside of a pivotally mounted lever member, with the outer side of the lever member being exposed to receive radiant heat at least in the area overlying the diaphragm. The lever member is formed of heat conductive material and thereby the radiant heat supplied to its upper surface is transmitted directly to the diaphragm. The diaphragm is thus responsive to radiant heat as well as to the room air temperature and at the same time it is protected from damage by the relatively rigid lever member.

The lever member in addition to mounting and protecting the diaphragm assembly also serves as the means for varying the operating temperature of the thermostat. The thermostat includes suitable switch means which are opened and closed by the diaphragm to control the room temperature, and by adjustment of the normal position of the lever member and the diaphragm relative to the switch means the operating temperature of the thermostat may be varied. To accomplish this adjustment, the lever member and diaphragm are spring biased in one direction and suitable cam means are provided for moving the lever and diaphragm against the spring bias. Thus, a readily adjustable thermostat suitable for radiant heating systems is provided, with the diaphragm being arranged to respond to the radiant energy as well as the changes in air temperature and also being well protected against damage.

By a further aspect of my invention, I provide a mounting of the lever member such that the calibration and operation of the thermostat will not be changed even if the thermostat is bumped or jarred during installation and use. In this regard, the lever member and the base on which it is mounted are formed with generally aligned slots. A pivot pin for the lever is extended through the slots and the biasing means for the lever are so arranged that the pivot pin engages the bottom of the slots in the lever member and the top of the slots in the base member, thereby forming the normal pivoting axis for the lever member. Upon bumping or jarring of the thermostat, the slots allow limited displacement of the pivot pin and the lever member relative to the normal axis while the spring bias causes the pivot pin to return to the normal axis once the jarring force is ended. Thus, damage to the diaphragm and lever member is avoided without disturbing the operation or calibration of the thermostat.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

FIG. 1 is a front elevational view of a room thermostat embodying my invention, the thermostat being shown in the typical wall mounting;

FIG. 2 is a side elevational view of the thermostat, also shown in the wall mounting;

FIG. 3 is a longitudinal cross sectional view illustrating certain details of the thermostat;

FIG. 4 is a cross sectional view taken between the lines 4—4 of FIG. 3;

FIG. 5 is a cross sectional view taken between the lines 5—5 of FIG. 3;

FIG. 6 is a bottom view of the switch assembly included in the thermostat, the view being partially broken away to show details;

FIG. 7 is a fragmentary view of the outer side of the base plate of the thermostat, illustrating certain stop means optionally usable to limit the range of adjustment of the thermostat;

FIG. 8 is a fragmentary view illustrating the terminal means included in the switch assembly of FIG. 6; and FIG. 9 is an exploded view further illustrating the parts and details of the thermostat.

Referring now to FIGS. 1 and 2, a preferred embodiment of my new and improved room thermostat 1 is shown therein in a typical wall mounting. The thermostat 1 includes a base plate 2 on which all the operating elements of the thermostat are mounted and in the illustrated embodiment the plate 2 is secured to the flanges of a conventional wall mounting box 3 by means of a pair of screws 4 and 5. The switch means 6 of the thermostat are mounted on the inner side of the plate 2 and extend into the wall box 3 through the open top thereof, while the operating and control elements of the thermostat including a lever member 7 and an adjusting knob 8 extend outwardly from the base plate toward the room being heated. The mounting box 3 is itself mounted to the wall, opening flush thereto, and the front of the opening in which the box and thermostat are mounted is generally closed by means of an appearance plate 11 which is secured to the base plate 2 by screws 12 and 13. It will be noted that the appearance plate 11 includes an aperture 13a through which the lever member 7 projects and a decorative cover 14 is snapped to the plate 13 so as to hide the lever member. A suitable aperture 15 is provided in the decorative plate to allow clearance for the control shaft connected to knob 8, and a second opening 16 is included in the plate for a purpose which will be explained hereinafter.

The thermostat 1 is intended for use with a radiant heating system, for example, an electrical heating system including radiant walls or panels, imbedded cables, or radiant baseboard units, and the main actuator or control element of the thermostat is arranged so that it responds both to the room air temperature and the radiant heat being supplied to the room. This main control element or actuator comprises a diaphragm assembly 17 which is positioned on the underside of the lever member 7 (see FIG. 3). The diaphragm assembly consists of a liquid filled, generally cylindrical vessel with a corrugated top and bottom walls and the bottom wall 17a expands downwardly or contracts upwardly (as viewed in FIG. 3) in response to the ambient air temperature and the radiant heat being supplied to the room. As best shown in FIGS. 3 and 9, the lever member 7 includes openings or slots 18 in the end flanges thereof so as to allow air to flow around the diaphragm assembly, and it will be understood that openings may also be provided in the side flanges of the lever to enhance this air flow, which will be at or about room temperature. The outer wall 19 of the diaphragm assembly is secured directly to the underside of the lever member 7 immediately beneath the aperture 16 in the appearance cover 14. Thus, the diaphragm assembly is secured to the lever member at an area which is exposed to the radiant heat being supplied to the room. The lever member 7 immediately beneath the aperture 16 in the for example, mild steel, and thus the radiant heat striking the lever member over the diaphragm assembly is conducted directly to the diaphragm assembly. To enhance the appearance of the thermostat, a suitable disc of heat conductive material may be applied to the lever directly over the diaphragm as shown at 20 although the use of such an appearance disc is entirely optional.

The diaphrgam assembly may be attached to the lever 7 in any suitable manner providing good heat conduction, and in the illustrated embodiment a boss 21 formed on the top wall 19 of the assembly contacts the underside of the lever over a fairly large area and is brazed thereto. A small opening 21a is provided in the lever over the center of the boss 21 for the purpose of locating the diaphragm in its proper position and also to serve as an inspection hole for checking to see that the brazing alloy has flowed around the joint.

With this mounting of the diaphragm assembly on the underside of the lever member 7, it will be seen that the diaphragm assembly is exposed both to the ambient temperature of the room air and also to the direct heat radiation within the room, as transmitted to it through the heat conductive material of the lever. It will also be noted that with this mounting the diaphragm assembly is protected against damage in case an object should strike the thermostat. Specifically, in case of bumping, the lever member rather than the diaphragm assembly will be struck whereby it is unlikely that the diaphragm assembly will be punctured or otherwise damaged.

The diaphragm assembly 17 operates the switch means 6 of the thermostat by means of a longitudinally movable plunger or operating rod 22 which extends inwardly from the corrugated bottom wall 17a of the diaphragm. As shown in FIG. 3, the corrugated wall may be provided with a suitable boss 23 for engaging the outer end of the operating rod. The lever 7 provides for control of the operating temperature of the thermostat by allowing adjustment of the normal position of the diaphragm assembly relative to the operating rod 22 and the switch means 6. Specifically, the lever 7 is mounted on the base plate 2 by means of a pivot pin 24 and by varying the angular position of the lever member on this pivot pin, the normal position of the diaphragm assembly may be adjusted up and down so as to vary the operating temperature of the thermostat. The manner in which the pivot pin 24 mounts the lever member forms an important aspect of my invention and it will be more fully described hereinafter.

Lever member 7 and the diaphragm assembly 17 are normally biased outwardly from the base plate 2 and the switch means 6 by means of a coil spring 25 which is positioned between the base plate and the underside 17a of the diaphragm assembly. This spring 25 may be best seen in FIGS. 3, 5 and 9. The spring 25 as it biases the diaphragm and lever outwardly, in effect, urges the lever to pivot relative to the pivot pin 24 and the normal position of the diaphragm assembly is selected by adjusting the lever on the pivot pin against the force of the spring 25. To effect this adjustment, the operating knob 8 is provided, this knob being mounted by means of a threaded stud 26 the inner end of which is held by a boss 27 formed on the base plate 2. More specifically, in the illustrated embodiment, the knob 8 is carried on a combination sleeve and cam 28 which is in turn threaded on the stud 26. The sleeve 28 includes an enlarged portion or shoulder 29 at its upper end and the inner surface of this shoulder comprises a cam surface 30 which engages a boss 31 formed on the lever member. As shown, the sleeve 28 extends through a suitable aperture 32 in the lever member and the boss 31 is located on a flange 33 which projects into the aperture at one side (see FIGS. 3, 4 and 9).

As the knob 8 is turned, a camming action is applied to the boss 31 due to the slope of the cam surface 30 together with the axial lead of the sleeve 28, the axial lead being provided by the threaded engagement between the sleeve and the shaft 26. Thus, as the knob 8 is turned, the lever 7 will be pivoted inwardly or outwardly by the cam surface 30 depending upon the direction in which the knob is turned. Since the diaphragm assembly is mounted directly on the lever, the turning of the knob 8 thereby moves the diaphragm assembly inwardly or outwardly relative to the base plate of the switch assembly. As will be more fully explained hereinafter, this adjustment of the normal position of the diaphragm adjusts the operating temperatures at which the contacts of the switch means 6 are opened and closed. Thus, the lever member 7 in addition to mounting and protecting the diaphragm also provides a means whereby the operating temperature of the thermostat may be controlled.

As mentioned, the manner in which the lever 7 is pivotally mounted on the base 2 comprises one important aspect of my invention. Specifically, the mounting of the lever 7 is such that it may be bumped or jarred during installation and use without causing damage to the diaphragm assembly 17 and without disturbing the operation or calibration of the thermostat. The lever is mounted by means of the aforementioned pivot pin or rod 24, and opposed projections or tabs are provided on the lever and the base 2 to accommodate the pivot pin. These tabs for accommodating the pivot pin are best shown in FIGS. 3 and 9, and as is particularly illustrated in FIG. 9, the base includes a pair of spaced apart, upstanding tabs 35 while the lever includes a pair of spaced apart, inwardly projecting tabs 36. Only one of the tabs 36 is shown in FIG. 9 but it will be understood that an identical tab to the one shown is formed on the opposite side of the lever in an aligned position. Each of the tabs 35 and 36 includes a triangular aperture or slot, and these slots 37, 38 are generally aligned when the lever is placed in position on the base.

The pivot pin 34 passes through slots 37 and 38 to mount the lever 7 on the base, the pin being headed on one end and mounting a washer at the other end to retain it within the slots. It will be noted from FIGS. 3 and 9 that the apexes of the triangular slots 37 in the base tabs point outwardly toward the lever 7. On the other hand, the apexes of the triangular slots 38 in the lever point inwardly toward the base. The lever 7 is spring biased away from the base by means of the spring 25 and as a result the tabs 36 pull outwardly on the pivot pin pulling it toward the tops of the slots 37 in the base tabs 35. In other words, due to the biasing action provided by the spring 25 and the triangular shape of the slots 37 and 38, the pivot pin 24 normally occupies a position at the bottom of the slots 38 and the top of the slots 37. This position thus forms the normal pivoting axis of the lever.

Now assume the lever is bumped or jarred as may happen during installation or perhaps even during use. For example, if the thermostat is used with baseboard heating and is located at or near the baseboard, a chair or other object may well be pushed into contact with the lever during use. If this should happen, the lever 7 has some freedom to move against the spring 25 without damaging the diaphragm assembly 17. As the lever 7 is pushed or jarred downwardly, the lever can move relative to the pivot pin until the top of the slots 38 engage the pivot pin. The pivot pin will then be pushed downwardly by the lever since there is still more room for it to move downwardly in the space provided by the slots 37 in the base. Thus, by reason of the triangular shaped slots mounting the pivot pin 34, the lever may deflect at the pivot end with the spring 25 acting to cushion the movement whereby no damage is done to the diaphragm assembly. The lever itself protects the diaphragm assembly so that the jarring or bumping object cannot strike it directly.

When the external force is removed, the lever will then automatically reseat itself in its normal position. Specifically, the lever is again pushed outwardly by the spring 25, and the sloping sides at the bottom of the slots 38 pull the pivot pin upwardly until it engages the sloping sides at the top of the slots 37. Thus, the lever, in effect, pulls the pivot pin upwardly until it resumes its normal position in the oppositely facing apexes of the slots 37 and 38, whereupon the thermostat is again in condition for operation without having been damaged and without having lost its calibration. The mounting and arrangement of the lever 7 thereby not only protects the diaphragm from damage during normal operation but allows for jarring or bumping of the thermostat without any of the ill effects which might otherwise occur.

The switch mechanism 6, which is operated by the diaphragm assembly 17 in response to the combined effect of the radiant heat and the ambient air temperature, is positioned on the opposite side of the base plate 2 from the lever 7 and the diaphragm. The switch means includes a two-part casing 40 formed of insulating material, such as a thermosetting plastic. This casing is secured to the base plate by a pair of screws 41 and 42 which pass through the upper and lower casing halves 43 and 44 into the base plate. The screws also serve to hold the casing halves together. Preferably, an insulating spacer 45 is positioned between the upper casing half and the base plate, this spacer including side flaps 46 and 47 and bottom tabs 48 and 49 (as best shown in FIGS. 4, 5 and 9) which serve to separate the switch housing from the mounting box 3.

The operating elements of the switch means 6 are positioned within a main cavity 50 formed between the casing halves 43 and 44. The movable element of the switch means, specifically, comprises a generally wedge-shaped operating arm 51 which is positioned centrally in the cavity 50. Adjacent its pointed end, the operating arm 51 rests on a rounded pivot 52 formed at the inner end of an adjust screw 53, and at its other or square end the operating arm carries a pair of movable contacts 54 and 55. The movable contacts 54 and 55 are arranged for engagement with cooperating fixed contacts 56 and 57 (see FIG. 9) and the operating arm is biased upwardly by means of a pair of biasing springs 58 and 59 so that the movable contacts are normally engaged with the fixed contacts. As shown in FIG. 3, the biasing springs are located between the operating arm 51 and the lower casing part 44. In order to separate the movable contacts from the fixed contacts, operating arm 51 is pivoted on the rounded point 52 of the adjust screw 53 against the biasing springs 58 and 59 by means of the operating rod 22 which extends downwardly from the diaphragm assembly 17. As is best shown in FIG. 3, the lower end 60 of the operating rod is conical shaped or pointed and a suitable recess 61 is provided in the top of the switch arm 51 to accommodate the tip of the operating rod.

In FIGS. 3 and 4, the cooperating contacts 54, 56 and 55, 57 are shown in their closed position. It will be understood that as the ambient temperature and the radiant heat applied to the diaphragm assembly 17 cause the movable wall 17a to expand, the rod 22 will be pushed inwardly against the switch arm 51. As this occurs, the part 51 will pivot on the boss 52 of the adjust screw and the contacts 54, 56 and/or 55, 57 will be separated so as to open the circuit controlled by the thermostat. The illustrated embodiment of the thermostat is intended for use in an electrical heating system and the contacts 54, 56 and 55, 57 serve to open one or the other or both sides of the main heating circuit when they are separated as the result of the expansion of the diaphragm. Although both sets of contacts may be opened as the diaphragm expands, since the operating arm is pivotally engaged with the lower end 60 of the operating rod and since the forces on the operating arm are not balanced, usually only one pair of contacts will open. But the opening of either set of contacts is, of course, effective to break the heating circuit.

As the room cools after the heating action is terminated, the diaphragm assembly senses the changing temperature, the wall 17a contracting as the temperature falls. As the diaphragm contracts, the springs 58 and 59 bias the operating arm 51 upwardly, and at a predetermined temperature the switch contacts are again closed. Thus, depending upon the setting of the lever 7, the switch contacts will be cycled on and off so as to maintain the heated room at the desired temperature. The average temperature which will be held by the thermostat may be controlled by turning the control knob 8 so as to set the normal position of the lever 7. As the knob 8 is turned, the cam surface 30 operating on the boss 31 determines the normal position of the lever. The further the lever is pivoted inwardly, the lower will be the temperature at which the contacts are opened by the diaphragm, and, vice versa, the further the lever is allowed to pivot outwardly under its spring bias, the higher will be the temperature at which the diaphragm opens the contacts. Thus, the operating temperature around which the control cycles may be varied by turning the operating knob. It will be understood that the thermostat is originally calibrated by means of the adjust screw 53, the screw being turned while the thermostat is subjected to controlled heat and temperature conditions so that the response of the thermostat corresponds to the temperature markings on the dial 8.

Referring to further details of the switch structure, it will be seen from FIGS. 6 and 9 that the switch means 6 includes four terminals 62, 63, 64 and 65 which are located at the four corners of the switch casing. The terminals 62–65 are held between the halves 43 and 44 of the switch casing and they each include a screw whereby the associated lead-in wires (not shown) may be connected in place. The terminals 62 and 63 are associated with the fixed contacts 56 and 57 and as will be seen from FIGS. 6, 8 and 9, each of the fixed contacts is mounted on a connector bar, 66 and 67 respectively, for connecting it to the associated terminal. Each bar 66 and 67 carries the associated fixed contact at its inner end, and at its outer end it includes a transverse portion that extends into the body of the terminal. For example, referring to FIG. 8, the bar 66 includes the transverse leg 68 projecting into the terminal 62. The screws 69 on the terminals hold the lead-in wires (not shown) trapped between the legs 68 and the interior surfaces of the terminals, thereby connecting the lead-in wires to the fixed contacts 56 and 57.

Internal connector bars are also provided for the terminals 64 and 65. These connector bars 70 and 71 likewise include a transverse portion which extends into the associated terminal and against which the lead wire is attached, and at their other ends, the bars 70 and 71 are joined to flexible conductive straps 72 and 73. The straps 72 and 73 are attached to the movable contacts 54, 55 at their other ends, and thereby separate conductive paths are formed respectively between the terminals 64 and 65 and the movable contacts 54 and 55. During operation, the switch operating arm 51 thus serves as a means for controlling separate circuits between the terminals 62, 64 and 63, 65 as it makes and breaks the cooperating contacts 54, 56 and 55, 57. The switch means of the illustrated thermostat may thereby be used to open and close both sides of the associated heating circuit although, as indicated above, usually only one pair of contacts open and close during normal operation.

As is best shown in FIG. 8, the lead wires for the various terminals are inserted into the switch casing through suitable apertures 74 which are provided in the lower casing half 44. It will be understood that one of these lead-in openings 74 is provided at each corner of the switch casing behind the respective terminals 62–65. It will be noted from FIG. 8 that each of the terminals, such as the terminal 62, rests on a flat surface 75 of the associated connector bar, and that, as mentioned above, the transverse leg 68 of the connector bar projects upwardly into the interior of the terminal. Thus the input lead may be trapped between the leg 68 and the interior surface of the terminal as the screw 69 is tightened. With this arrangement, excellent contact is provided between the lead wire and the connector bar at each of the terminals.

In addition to the other features included in the illustrated thermostat, I also provide a positive "off" position for the control knob 8 and adjustable stops whereby the limits of the operating range may be preset. The means for providing the positive "off" are best shown in FIG. 3. As is there shown, a second control rod or plunger 76 extends through the top of the switch casing on the left-hand side of the main operating rod 22. This control rod 76 engages the switch arm 51 at its inner end, and at its outer end it is positioned for engagement with a cam 77 carried on the control sleeve 28. When the control knob 8 is turned so that the off mark on the exterior of the knob registers with the indicator 78 on the appearance cover (FIG. 1), the cam 77 comes into registry with the head 79 of rod 76. The rod or pin 76 is thereby cammed inwardly and depresses the switch arm so as to positively open the contacts 54, 56 and 55, 57. Thereby, a positive "off" is provided for the thermostat when the adjust knob is moved to the extreme off position. A disc-like element 79a formed with the cam 77 prevents the rod 76 from falling out of the thermostat if it is tipped or placed upside down during shipment or installation.

For certain uses, it may be desirable that the control be capable of adjustment only within predetermined limits, for example, between 60° and 80° F. To provide this feature, I have mounted a pair of adjustable stops 80 and 81 on the base plate 2 beneath the cam 77. As may best be seen in FIG. 7, these stops 80 and 81 comprise a pair of elongated slotted strips having upturned flanges at their adjacent ends. These strips are positioned on studs 82 and 83 mounted on the base plate and are slidable inwardly and outwardly relative to the control sleeve 28. The screws 84 and 85 are loosened to allow movement of the stops, and are then tightened once the stops are in the desired position. It will be seen that as the stops are moved inwardly, their inner ends reach points wherein they will be contacted by a flag 86 formed on the control sleeve 28. The engagement of the flag 86 with these stops will thereby limit the range of adjustment of the control. It will be noted that this feature is, however, entirely optional and that if desired the stops 80 and 81 may be moved to their outward position, as indicated by the dotted lines. In this position, they will not engage the flag 86 and thereby will not limit the range of adjustment of the control. If the stops are moved to this outward position, the limit of adjustment is then provided by a flag 87 formed on the control sleeve 28 directly below the cam surface 30. This flag 87 engages the opposite ends of the flange 33 (FIGS. 3 and 9) formed on the lever 7 so as to limit the movement of the knob. The flange 33 is, of course, the portion of the lever which carries the follower boss 31.

The limit stop 80 provides one additional feature besides those already mentioned, and that is to provide a means for locking the control in its off position. If the control sleeve 28 is turned counterclockwise (as viewed in FIG. 7) to the extreme position permitted by flag 87 and flange 33, and the stop 80 is then moved inwardly, the arm 88 of stop 80 will then engage the flag 86 so as to lock the control shaft in that position. This arrangement may be used to lock the control knob and sleeve in the off position in summer months. It will be noted that a similar arm 88 is formed on the stop 83 but this arm provides no function in the control. To save tooling cost, however, it is desirable to use the same form for both stops 80 and 81.

From the above, it will be seen that I have provided a new and improved thermostat particularly adapted for use with radiant heating systems. In this thermostat, the control element or diaphragm is arranged so that it is responsive both to the ambient air temperature and to the radiant heat being supplied to the room. The diaphragm is, however, protected so that it will not be damaged if the thermostat is struck or jarred during installation or service. In addition, the lever mounting means for this thermostat provide a cushioning effect whereby the jarring or bumping force will be taken up by movement of the lever, but yet the lever will be returned to its normal position for immediate operation as soon as the force is removed. The control arrangement of the thermostat provides for adjustment of the temperature over wide limits, and in addition incorporates stops whereby that range may be limited at the option of the installer or the user. A lock is also included for holding the thermostat in cold or off position during the summer months or whenever such action is desired.

With regard to the manufacture of the illustrated thermostat, the lever assembly and the control means located on the outer side of the base plate are preferably mounted to the base plate to form a sub-assembly. The biasing spring is included within this sub-assembly, as are the stud 26, the control sleeve 28, the stops 80 and 81 and all the other elements lying wholly outside the base plate, with the exception of the control knob 8 which may be added at any time. To complete the thermostat, the switch means 6 and the operating rods 22 and 76 are mounted to the contact and lever sub-assembly. The switch means are, of course, held in place by the screws 41 and 42, and these screws also hold the two halves of the switch casing together. The operating rods 22 and 76 are placed in position before the switch casing is mounted, and they are trapped in position once the assembly of the switch casing is completed. It will be noted that bosses 90 and 91 formed on the upper casing half project through apertures in the base plate to act as guides for rods 22 and 76. As shown, it is through cylindrical apertures formed in these bosses that the rods 22 and 76 project into the switch cavity to engage the switch arm 51. The insulator sheet 45 is positioned between the base plate and the switch casing during the assembly process and it too is held in place by the action of the screws 41 and 42. Once the thermostat is completed in this manner by attaching the switch means, etc., to the lever and control sub-assembly, the thermostat is then calibrated by means of the adjust screw 53 and is ready for installation and service.

While in accordance with the patent statutes, I have described what at present is considered to be the preferred embodiment of my invention, it will be apparent to those skilled in the art that various changes and modifications may be made therein without departing from the invention, and, therefore, it is aimed by the appended claims to cover all such equivalent variations as fall within the true spirit and scope of the invention.

What I claim as new and desire to secure by Letters Patent of the United States is as follows:

1. A space thermostat comprising a pivotally mounted lever member formed of heat conductive material and exposed at least in part to receive radiant heat energy from the space to be controlled, a temperature responsive actuator mounted on said lever member and receiving said radiant heat energy by conduction therefrom, spring means normally biasing said lever member and said actuator in one direction, switch means operated by said actuator, and manually operable cam means for adjusting the position of said lever member and actuator against the bias of said spring means, thereby to vary the temperature at which said switch means is operated by said actuator.

2. A space thermostat comprising a pivotally mounted lever member formed of heat conductive material, a temperature responsive actuator mounted on the underside of said lever member, with the outer side of said lever member being exposed at the least in the area overlying said actuator to receive radiant heat energy from the space to be controlled by said thermostat, said actuator receiving said radiant heat energy from said lever member by conduction therefrom, spring means normally biasing said lever member and said actuator in one direction, switch means operated by said actuator, and manually operable cam means for adjusting the position of said lever member and actuator against the bias of said spring means, thereby to vary the temperature at which said switch means is actuated by said actuator.

3. A space thermostat comprising a pivotally mounted lever member formed of heat conductive material, a temperature responsive diaphragm mounted on the underside of said lever member, with the outer side of said lever member being exposed at least in the area over said diaphragm to receive radiant heat energy from the space to be controlled by said thermostat, said diaphragm receiving said radiant heat energy from said lever member by conduction therefrom, spring means normally biasing said lever and said diaphragm in one direction, switch means actuated by said diaphragm, manually operable cam means for adjusting the position of said lever and diaphragm against the bias of said spring means, thereby to vary the temperature at which said switch means is actuated by said diaphragm, and mounting means for said lever member allowing temporary displacement of the normal pivoting axis thereof upon jarring of said lever member, thereby to avoid damage to said diaphragm.

4. In a space thermostat, switch means, a temperature responsive diaphragm for operating said switch means, a lever mounting said diaphragm for adjustment relative to said switch means thereby to vary the response temperature of said thermostat, a base member for supporting said lever, and means for pivotally mounting said lever on said base member comprising a pair of tabs formed on said base member, with each of said tabs having a triangular shaped slot therein, a pair of projections formed on said lever and disposed adjacent said tabs on said base member, with each of said projections having a generally triangular slot therein, pivot means extending through said slots, and spring means normally biasing said lever so that said pivot means engage the bottom of the slots in said lever projections and the top of the slots in said base member tabs, thereby to form a normal pivoting axis for said lever, with said slots allowing limited displacement of said pivot means and said lever relative to said normal axis upon abnormal forces being applied to said lever thereby to avoid damage to said diaphragm.

5. In a space thermostat, switch means, a temperature responsive actuator for operating said switch means, a lever mounting said actuator for adjustment relative to said switch means thereby to vary the response temperature of said thermostat, a base member for supporting said lever, and means for pivotally mounting said lever on said base member comprising generally aligned slots formed in said base member and said lever, pivot means extending through said slots, and spring means normally biasing said lever so that said pivot means engage the bottom of the slots in said lever and the top of the slots in said base member, thereby to form a normal pivoting axis for said lever, with said slots allowing limited displacement of said pivot means and said lever relative to said normal axis upon abnormal forces being applied to said lever thereby to avoid damage to said temperature responsive actuator.

6. A space thermostat comprising switch means including stationary contact means, a movable contact member and an enclosing casing, a base member mounting said switch means on one side thereof, and means for operating said switch means comprising a temperature responsive actuator positioned on the opposite side of said base member, an operating rod extending between said actuator and said contact member through openings in said base member and said switch casing, a lever pivotally supported on said opposite side of said base member and mounting said actuator for adjustment relative to said contact member, spring means biasing said lever and said actuator away from said contact member, and cam means mounted on said base member and engaging said lever for adjusting the position of said lever and said actuator against the bias of said spring means, thereby to control the temperature at which said actuator operates said contact member.

7. A space thermostat comprising switch means including stationary contact means, a movable contact member and an enclosing casing, a base member mounting said switch means on one side thereof, and means for operating said switch means comprising a temperature responsive actuator positioned on the opposite side of said base member, an operating rod extending between said actuator and said contact member through openings in said base member and said switch casing, a lever pivotally supported on said opposite side of said base member and mounting said actuator for adjustment relative to said contact member, spring means biasing said lever and said actuator away from said contact member, cam means engaging said lever for adjusting the position of said lever and said actuator against the bias of said spring means, thereby to control the temperature at which said actuator operates said contact member, a rotatable shaft mounted on said base and carrying said cam means, and adjustable means for limiting the rotation of said shaft thereby to limit the operating range of said thermostat, said adjustable means comprising a radial projection formed on said shaft and a pair of stop members for engaging said projection, said stop members being slidably mounted on said base and engaging said projection at varying points in its arcuate path depending upon their position of adjustment on said base.

8. A space thermostat comprising a self-contained switch means including stationary contact means, a movable contact member and an enclosing casing, a base member mounting said switch means on one side thereof, and means for operating said switch means comprising a temperature responsive diaphragm positioned on the opposite side of said base member, an operating plunger extending between said diaphragm and said contact member through openings in said base member and said switch casing, a lever pivotally supported on said opposite side of said base member and mounting said diaphragm for adjustment relative to said contact member, said diaphragm being mounted on the underside of said lever with the outer side of said lever being exposed at least in the area overlying said diaphragm to receive radiant heat energy from the space to be controlled by said thermostat, spring means disposed around said plunger between said base member and said lever and biasing said lever and said diaphragm away from said contact member, and cam means mounted on said base member and engaging said lever for adjusting the position of said lever and said diaphragm against the base of said spring means, thereby to contact the temperature at which said diaphragm actuates said contact member.

References Cited in the file of this patent

UNITED STATES PATENTS

| | | |
|---|---|---|
| 2,269,776 | Lindemann | Jan. 13, 1942 |
| 2,404,139 | McCormick | July 16, 1946 |
| 2,500,061 | Clark | Mar. 7, 1950 |
| 2,536,831 | Allan | Jan. 2, 1951 |
| 2,739,204 | Garner et al. | Mar. 20, 1956 |
| 2,839,633 | Moyer | June 17, 1958 |
| 3,038,979 | Yanikoski | June 12, 1962 |
| 3,065,323 | Grimshaw | Nov. 20, 1962 |